(12) United States Patent
Tsukamoto et al.

(10) Patent No.: US 11,511,307 B2
(45) Date of Patent: Nov. 29, 2022

(54) METHOD FOR MANUFACTURING ELECTRODE SHEET FOR USE IN POWER STORAGE DEVICE AND APPLICATOR

(71) Applicant: SANYO ELECTRIC CO., LTD., Daito (JP)

(72) Inventors: Masashi Tsukamoto, Hyogo (JP); Tomofumi Yanagi, Osaka (JP); Motoki Kinugawa, Kyoto (JP)

(73) Assignee: SANYO Electric Co., Ltd., Daito (JP)

( * ) Notice: Subject to any disclaimer, the term of this patent is extended or adjusted under 35 U.S.C. 154(b) by 166 days.

(21) Appl. No.: 15/768,935

(22) PCT Filed: Oct. 27, 2016

(86) PCT No.: PCT/JP2016/004717
§ 371 (c)(1),
(2) Date: Apr. 17, 2018

(87) PCT Pub. No.: WO2017/077696
PCT Pub. Date: May 11, 2017

(65) Prior Publication Data
US 2019/0054495 A1 Feb. 21, 2019

(30) Foreign Application Priority Data
Nov. 6, 2015 (JP) .............................. JP2015-218221

(51) Int. Cl.
*B05C 5/02* (2006.01)
*H01G 11/86* (2013.01)
(Continued)

(52) U.S. Cl.
CPC .......... *B05C 5/0225* (2013.01); *B05C 5/0258* (2013.01); *B05C 5/0279* (2013.01);
(Continued)

(58) Field of Classification Search
CPC ... B05C 5/0225; B05C 5/0258; B05C 5/0279; H01G 11/86; H01G 13/006; H01G 13/00; H01M 4/0404; H01M 4/139; B05D 1/305
See application file for complete search history.

(56) References Cited

U.S. PATENT DOCUMENTS 5,989,622 A * 11/1999 Iwashita ............... B05C 5/0254
427/256
6,410,100 B1 * 6/2002 Bernert ................... B05B 1/267
427/475
(Continued)

FOREIGN PATENT DOCUMENTS

CN         1442235 A        9/2003
CN       101849304 A        9/2010
(Continued)

OTHER PUBLICATIONS

Simitsu, JP 2001-006664, machine translation, originally published 2001, p. 1-9 (Year: 2001).*
(Continued)

*Primary Examiner* — Katherine A Bareford
*Assistant Examiner* — Christina D McClure
(74) *Attorney, Agent, or Firm* — WHDA, LLP

(57) ABSTRACT

A power storage device and an applicator is obtained that achieve an increase in capacity and an improvement in productivity, and that enable the thickness of a mixture layer to be inhibited from varying. A positive electrode mixture slurry is discharged into discharge regions of a belt-like positive electrode current collector that extend in a length direction of the positive electrode current collector from discharge nozzles corresponding to the respective discharge regions to form a positive electrode mixture layer on the positive electrode current collector. The discharge regions are arranged such that a part of each of the discharge regions overlaps a part of another of the discharge regions adjacent (Continued)

thereto when viewed in the length direction to form overlapping portions. The positive electrode mixture slurry is intermittently discharged to form an exposed portion on at least one of the discharge regions.

4 Claims, 6 Drawing Sheets

(51) Int. Cl.
    *H01M 4/139*     (2010.01)
    *H01G 13/00*     (2013.01)
    *H01M 4/04*     (2006.01)

(52) U.S. Cl.
    CPC ............. *H01G 11/86* (2013.01); *H01G 13/00* (2013.01); *H01G 13/006* (2013.01); *H01M 4/0404* (2013.01); *H01M 4/139* (2013.01)

(56) References Cited

U.S. PATENT DOCUMENTS

| | | | |
|---|---|---|---|
| 2003/0155451 A1* | 8/2003 | Nakamura | B05B 1/044 239/597 |
| 2005/0056214 A1* | 3/2005 | Tomaru | B05C 9/06 118/411 |
| 2005/0255249 A1* | 11/2005 | Schlatterbeck | B05D 1/36 427/372.2 |
| 2011/0225808 A1* | 9/2011 | Oshima | H01M 4/0404 29/623.1 |
| 2014/0170481 A1* | 6/2014 | Nakamura | H01M 4/131 429/200 |

FOREIGN PATENT DOCUMENTS

| | | |
|---|---|---|
| JP | 2000-311677 A | 11/2000 |
| JP | 2001-6664 A | 1/2001 |
| JP | 2001-293416 A | 10/2001 |
| JP | 2002-28554 A | 1/2002 |
| JP | 2003-68271 A | 3/2003 |
| JP | 2009-211058 A | 9/2009 |
| JP | 2014-137944 A | 7/2014 |
| WO | 2010/082230 A1 | 7/2010 |
| WO | WO-2014149898 A1 * | 9/2014 ............. B05B 5/025 |

OTHER PUBLICATIONS

International Search Report dated Jan. 31, 2017, issued in Counterpart of International Application No. PCT/JP2016/004717 (2 pages).

English Translation of Office Action dated Oct. 12, 2020, issued in counterpart CN Application No. 201680061323.9. (4 pages).

\* cited by examiner

Figure 6
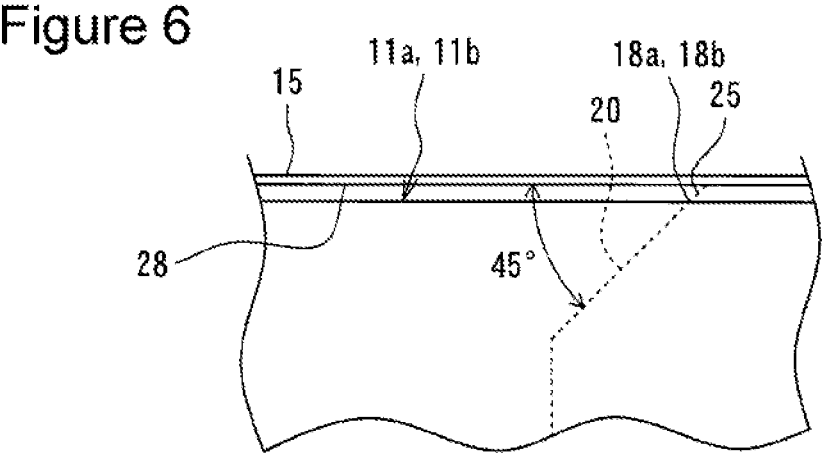
Figure 7
(a)
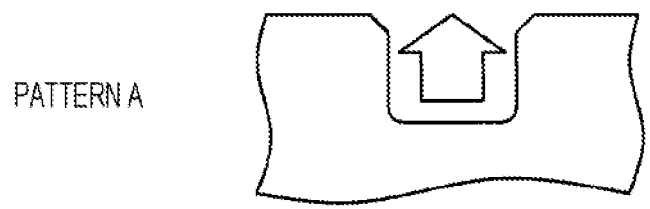
PATTERN A
(b)
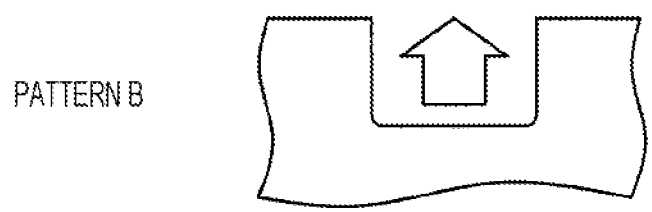
PATTERN B

METHOD FOR MANUFACTURING ELECTRODE SHEET FOR USE IN POWER STORAGE DEVICE AND APPLICATOR

TECHNICAL FIELD

The present disclosure relates to a method of manufacturing an electrode sheet for use in a power storage device and an applicator.

BACKGROUND ART

In recent years, as electronic devices rapidly become portable and cordless, the desire to increase the capacity of secondary batteries used as power sources for driving the electronic devices increases. Against such a background, for a non-aqueous electrolyte secondary battery in PTL 1, a positive electrode mixture layer is formed by applying a positive electrode mixture slurry on a belt-like positive electrode current collector. Subsequently, a part of the positive electrode mixture layer is separated to form an exposed portion at which there is no positive electrode mixture layer. A positive electrode lead is welded to the exposed portion. The width of the exposed portion is less than the width of the positive electrode sheet. This enables the exposed portion to be formed within a region in the width direction to increase the region of the positive electrode mixture layer and achieves an increased capacity.

A technique disclosed in PTL 1 described above needs to separate the part of the positive electrode mixture layer. However, the separation reduces productivity and wastes the cost of the material of the separated positive electrode mixture layer. Regarding this, in PTL 2, a technique for increasing the capacity and improving the productivity is proposed. An applicator disclosed in PTL 2 includes nozzles. Discharge ports of the nozzles are arranged so as not to overlap when viewed in the length direction of the positive electrode current collector.

The positive electrode mixture slurry is discharged from the nozzles into regions of the positive electrode current collector that are divided in the length direction. The exposed portion and the positive electrode mixture layer are formed as desired in a manner in which, while the positive electrode current collector is moved in a constant speed, the positive electrode mixture slurry is appropriately discharged thereto from the nozzles or the discharge is suspended. The applicator does not need to separate the positive electrode mixture layer and improves the productively.

CITATION LIST

Patent Literature

PTL 1: Japanese Published Unexamined Patent Application No. 2003-68271
PTL 2: Japanese Published Unexamined Patent Application No. 2001-6664

SUMMARY OF INVENTION

Technical Problem

In the applicator in PTL 2, the discharge ports of the nozzles are arranged so as not to overlap when viewed in the length direction of the current collector, and the positive electrode mixture slurry is applied from each nozzle to the corresponding divided region of the current collector. However, it has been revealed that applying the positive electrode mixture slurry to the positive electrode current collector in this manner makes it difficult to make the thickness of the positive electrode mixture layer uniform.

It is an object of the present disclosure to provide a method of manufacturing an electrode sheet for use in a power storage device and an applicator that achieve an increase in the capacity and an improvement in the productivity, and that enable the thickness of the mixture layer on the current collector to be inhibited from varying.

Solution to Problem

A method of manufacturing an electrode sheet for use in a power storage device according to the present disclosure includes discharging a mixture slurry into discharge regions of a belt-like current collector that extend in a length direction of the current collector from discharge nozzles corresponding to the respective discharge regions to form a mixture layer on the current collector. The discharge regions are arranged such that a part of each discharge region overlaps a part of another discharge region adjacent thereto when viewed in the length direction of the current collector to form an overlapping portion. The mixture slurry is intermittently discharged to form an exposed portion on at least one of the discharge regions.

An applicator according to the present disclosure includes discharge ports extending in a first direction. Each discharge port includes a region that does not overlap all of the other discharge ports and a region that overlaps a part of another discharge port adjacent to the discharge port when viewed in a second direction perpendicular to the first direction.

Advantageous Effects of Invention

The method of manufacturing the electrode sheet for use in the power storage device and the applicator according to the present disclosure achieve an increase in the capacity and an improvement in the productivity, and enable the thickness of the mixture layer on the current collector to be inhibited from varying.

BRIEF DESCRIPTION OF DRAWINGS

FIG. 6 is an enlarged view of a region denoted by R in FIG. 5(a) and schematically illustrates an angle formed between a discharge channel of the discharge nozzle and the application surface of the positive electrode current collector.

FIG. 7(a) and FIG. 7(b) schematically illustrate the shape of a front end portion of a channel of each discharge nozzle used in experimental examples.

DESCRIPTION OF EMBODIMENTS

Figure 1:
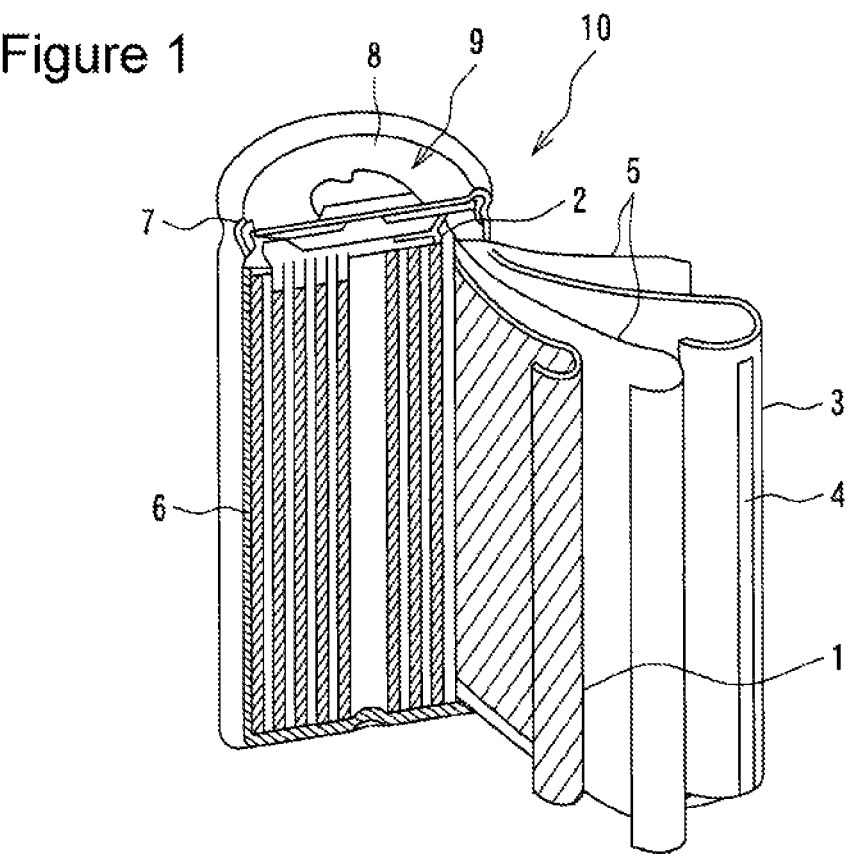
FIG. 1 illustrates the structure of a non-aqueous electrolyte secondary battery manufactured by using an applicator and a manufacturing method according to an embodiment.

An embodiment of the present disclosure (referred to below as the embodiment) will hereinafter be described in detail with reference to the drawings. In the description, specific shapes, materials, numeral values, and directions, for example, are examples for making the present disclosure easy to understand and can be appropriately changed in accordance with, for example, use, purpose, and specification. In the case where the description includes embodiments, modifications, and so on, it is assumed from the start that the features thereof are appropriately combined. The drawings referred in the description of each embodiment are schematically illustrated. In some cases, dimensional ratios of components illustrated in the drawings, for example, differ from actual ratios. The meaning of the term "substantially" in the description is such that, in the case where the phrase "substantially the entire region" is taken as an example, the meaning includes not only "the entire region" but also "substantially the entire region".

FIG. 1 illustrates the structure of a non-aqueous electrolyte secondary battery 10 that can be appropriately manufactured by using an applicator and a manufacturing method according to the present embodiment.

As illustrated in FIG. 1, the non-aqueous electrolyte secondary battery 10, which is an example of a power storage device, includes a cylindrical battery case 6 that accommodates an electrode group of a positive electrode sheet 1 and a negative electrode sheet 3 that are wound with a separator 5 interposed therebetween together with an electrolytic solution. An opening of the battery case 6 is sealed by a sealing plate 9 with a gasket 7 interposed therebetween. The inside of the battery case 6 is sealed. A positive electrode lead 2 connects the positive electrode sheet 1 to a positive electrode lid 8 disposed on the sealing plate 9. The positive electrode lid 8 serves as a positive terminal. A negative electrode lead 4 connects the negative electrode sheet 3 to the battery case 6. The battery case 6 serves as a negative terminal.

The positive electrode sheet 1 is manufactured in the following manner. A conductive material, a binder, and so on are mixed with a positive electrode active material. The mixture is kneaded in a dispersion medium to form a paste of positive electrode mixture slurry. The positive electrode mixture slurry is applied to a hoop-like positive electrode current collector formed of metallic foil such as aluminum to form a positive electrode mixture layer. Subsequently, the positive electrode mixture layer is dried and compressed. Finally, the positive electrode current collector on which the positive electrode mixture layer is formed is cut with predetermined dimensions to manufacture the positive electrode sheet 1.

The negative electrode sheet 3 is manufactured in the following manner. A conductive material, a thickener, and so on are mixed with a negative electrode active material. The mixture is kneaded in a dispersion medium to form a paste of negative electrode mixture slurry. The negative electrode mixture slurry is applied to a hoop-like negative electrode current collector formed of metallic foil such as copper to form a negative electrode mixture layer. Subsequently, the negative electrode mixture layer is dried and compressed. Finally, the negative electrode current collector on which the negative electrode mixture layer is formed is cut with predetermined dimensions to manufacture the negative electrode sheet 3.

The positive electrode lead 2 is welded to the positive electrode sheet 1 at a predetermined position by spot welding. The negative electrode lead 4 is welded to the negative electrode sheet 3 at a predetermined position by spot welding. The positive electrode sheet 1 and the negative electrode sheet 3 each have an exposed portion at which no mixture slurry is applied. It is necessary for the positive electrode lead 2 and the negative electrode lead 4 to be directly welded to the current collector of the positive electrode sheet 1 and the current collector of the negative electrode sheet 3. Each exposed portion forms a lead connection to which the positive electrode lead 2 or the negative electrode lead 4 is connected.

The positive electrode current collector and the positive electrode mixture slurry for use in the non-aqueous electrolyte secondary battery, which are examples of the current collector and the mixture slurry according to the present disclosure, will now be described to describe the detail of the present embodiment.

Figure 2:
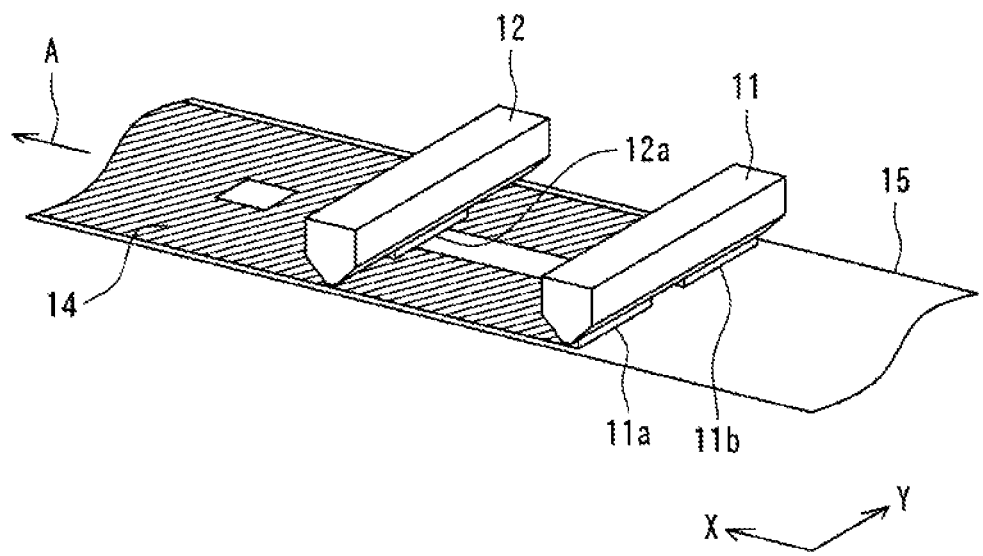
FIG. 2 schematically illustrates an outline of a process of applying a positive electrode mixture slurry to a positive electrode current collector.

An outline of a process of applying the positive electrode mixture slurry according to the present embodiment will be described with reference to FIG. 2. A hoop-like positive electrode current collector 15 is unwound with a drive roll, not illustrated, so as to move at a constant speed in a length direction illustrated by an arrow A. In this state, the positive electrode mixture slurry is discharged from first and second discharging portions 11 and 12 located above the positive electrode current collector 15 toward the positive electrode current collector 15 to form a positive electrode mixture layer 14 on the positive electrode current collector 15. The first discharging portion 11 includes discharge nozzles 11a and 11b. The second discharging portion 12 includes a discharge nozzle 12a.

The positive electrode mixture slurry is continuously discharged from the discharge nozzles 11a and 11b. The positive electrode mixture slurry is intermittently discharged from the discharge nozzle 12a. Thus, the discharge nozzles 11a and 11b are continuous-discharge nozzles. The discharge nozzle 12a is an intermittent-discharge nozzle. Discharge ports of the continuous-discharge nozzles and a discharge port of the intermittent-discharge nozzle are alternately arranged in a width direction Y.

Figure 3:
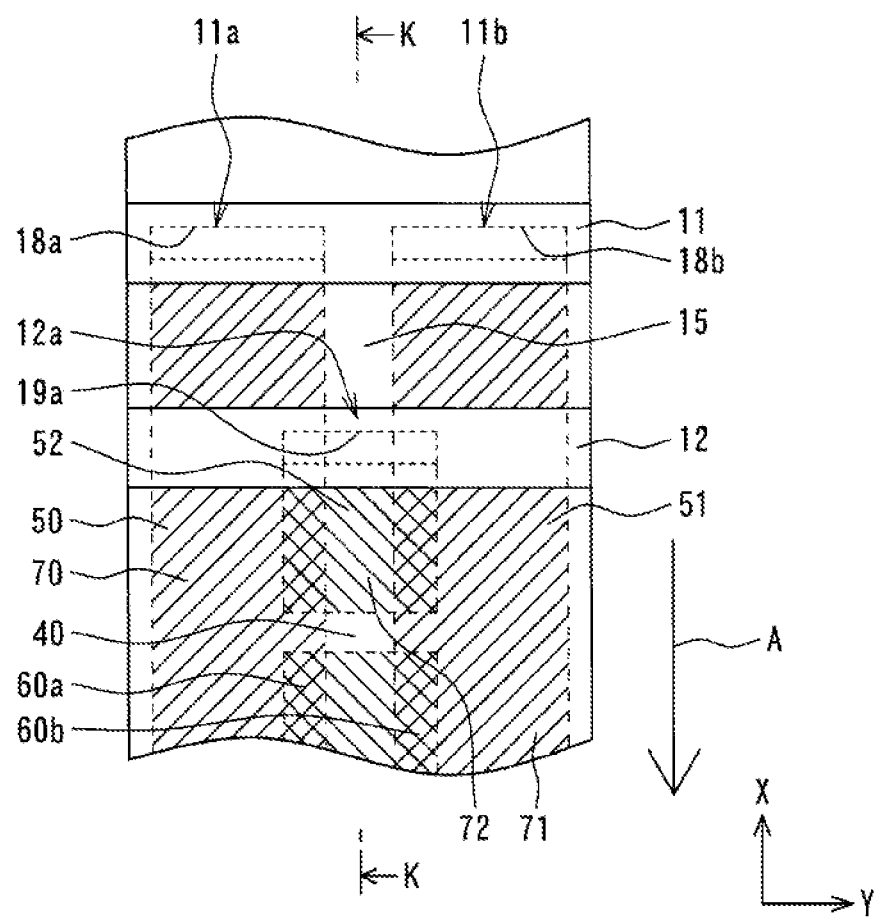
FIG. 3 schematically illustrates discharge regions extending in the length direction of the positive electrode current collector.

FIG. 3 schematically illustrates discharge regions 50, 51, and 52 extending in a length direction X of the positive electrode current collector 15. The discharge regions 50, 51, and 52 are regions in which the positive electrode mixture slurry discharged from the discharge nozzles 11a, 11b, and 12a is assumed to collide with the positive electrode current collector 15. The positions of the discharge nozzles 11a, 11b, and 12a and discharge ports 18a, 18b, and 19a with respect to the positive electrode current collector 15 are determined on the basis of the discharge regions 50, 51, and 52. In the case where the positive electrode mixture slurry is discharged to the positive electrode current collector 15 along the thickness direction thereof as in the present embodiment, the discharge regions 50, 51, and 52 and the discharge ports 18a, 18b, and 19a overlap when viewed in the thickness direction thereof.

The lengths of the discharge regions 50 and 51 in the width direction Y are equal to each other. The discharge region 51 contains an exposed portion 40 at which no positive electrode mixture slurry is applied. The discharge regions 50 and 52 are arranged such that a part of the discharge region 50 and a part of discharge region 52 overlap when viewed in the length direction X. Similarly, the discharge regions 51 and 52 are arranged such that a part of the discharge region 51 and a part of the discharge region 52 overlap when viewed in the length direction X. Thus, overlapping portions 60a and 60b and non-overlapping portions 70, 71, and 72 are formed in the discharge regions 50, 51, and 52.

After the discharge regions 50, 51, and 52 are defined, the positions of the first discharging portion 11 including the discharge ports 18a and 18b and the second discharging portion 12 including the discharge port 19a with respect to the positive electrode current collector 15 are determined. According to the present embodiment, as illustrated in FIG. 3, the first discharging portion 11 and the second discharging portion 12 are arranged such that both ends of the discharge ports 18a, 18b, and 19a in the width direction Y coincide with both ends of the discharge regions 50, 51, and 52 in the width direction Y. The first discharging portion 11 is spaced apart from the second discharging portion 12 in the length direction X of the positive electrode current collector 15. According to the present embodiment, the second discharging portion 12 is located on the leading side of the first discharging portion 11 in a movement direction A of the positive electrode current collector 15. The second discharging portion 12 may be located on the trailing side of the first discharging portion 11 in the movement direction A of the positive electrode current collector 15. The discharge ports 18a, 18b, and 19a each have a rectangular planar shape extending in the width direction Y of the positive electrode current collector 15. The discharge nozzles 11a, 11b, and 12a include control valves for controlling supply of the positive electrode mixture slurry from a storage tank, not illustrated, and suspension of the supply. The control valves are independently controlled. The supply of the positive electrode mixture slurry from the discharge nozzles 11a, 11b, and 12a and the suspension of the supply can be controlled at any time by using the control valves. The supply of the positive electrode mixture slurry to the discharge nozzle 12a and the suspension of the supply are repeated, and thus, the positive electrode mixture slurry is intermittently discharged from the discharge nozzle 12a. Consequently, the exposed portion 40, which serves as a positive electrode lead connection, is formed.

Figure 4:
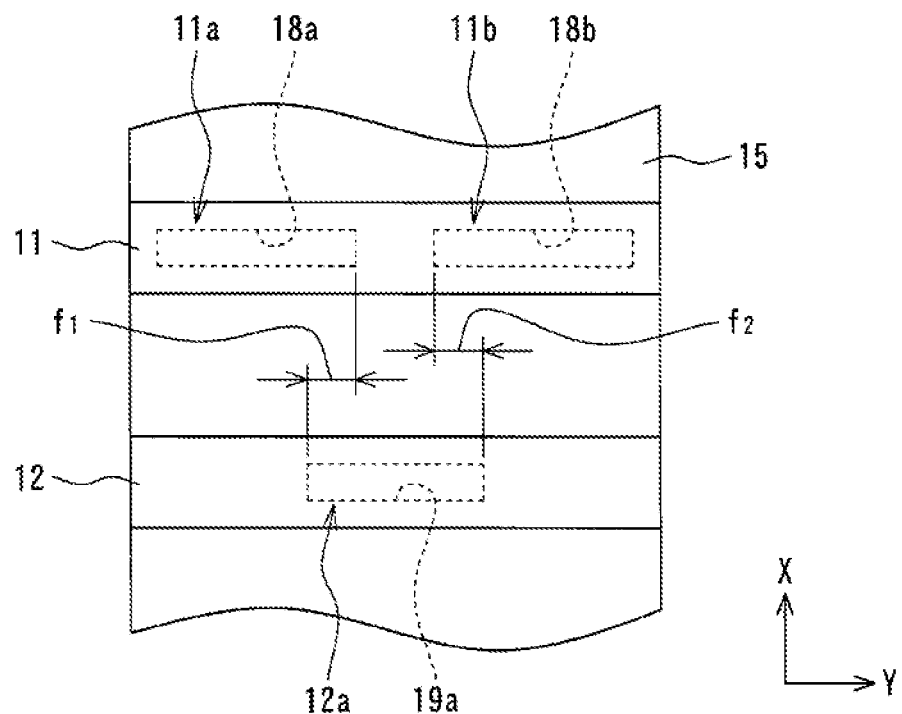
FIG. 4 is a schematic view of the positive electrode current collector viewed from above an application surface and illustrates the relative positions of discharge nozzles with respect to the positive electrode current collector.

As illustrated in FIG. 4, a part of the discharge port 19a overlaps a part of the discharge port 18a when viewed in the length direction X. The length of the overlap is $f_1$ [mm]. A part of the discharge port 19a overlaps a part of the discharge port 18b when viewed in the length direction X. The length of the overlap is $f_2$ [mm]. The lengths $f_1$ [mm] and $f_2$ [mm] of the overlap are equal to the lengths of the overlapping portions 60a and 60b (see FIG. 3) in the width direction Y, respectively.

Figure 5:
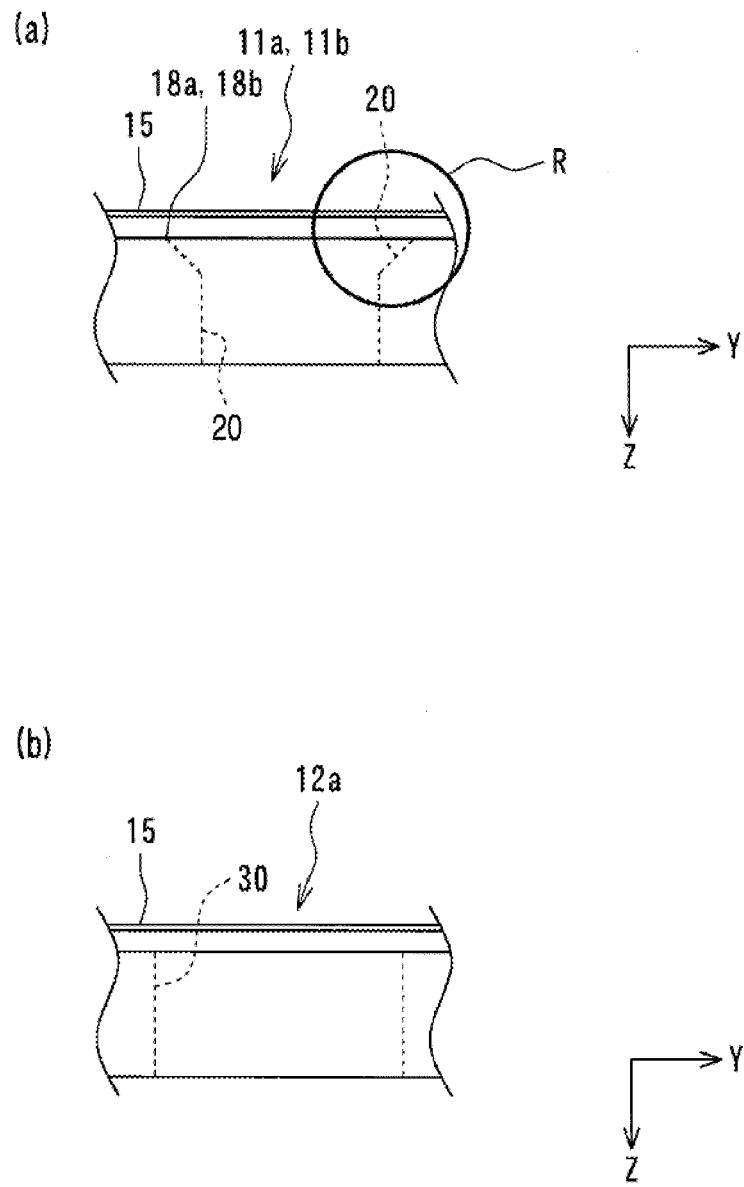
FIG. 5(a) schematically illustrates a front end portion of a channel of each discharge nozzle in a first discharging portion, and FIG. 5(b) schematically illustrates a front end portion of a channel of a discharge nozzle in a second discharging portion.

FIG. 5(a) schematically illustrates a front end portion 20 of a channel of each of the discharge nozzles 11a and 11b. FIG. 5(b) schematically illustrates a front end portion 30 of a channel of the discharge nozzle 12a.

As illustrated in FIG. 5(a), the direction in which the front end portion of the channel of each of the discharge nozzles 11a and 11b extends is the same as the thickness direction Z of the positive electrode current collector 15. The length of the front end portion 20 of the channel of the discharge nozzle 11a in the width direction Y increases as the position thereof is nearer to the discharge port 18a. As illustrated in FIG. 5(b), the direction in which the discharge nozzle 12a extends is the same as the thickness direction Z of the positive electrode current collector 15. The length of the front end portion 30 of the channel of the discharge nozzle 12a in the width direction Y is constant regardless of the position of the front end portion 30 of the channel in the direction in which the front end portion extends.

FIG. 6 is an enlarged view of a region denoted by R in FIG. 5(a) and schematically illustrates an angle formed between the front end portion 20 of the channel of each of the discharge nozzles 11a and 11b and an application surface 28 of the positive electrode current collector 15.

The length of the front end portion 20 of the channel in the width direction Y linearly increases as the position thereof is nearer to the discharge port 18a. As illustrated in FIG. 6, an extension surface 25, which is a side surface of the front end portion 20 of the channel that expands, intersects with the application surface 28 of the positive electrode current collector 15 at an acute angle of, for example, 30° to 60°, preferably an angle of 45°.

According to the present embodiment, the exposed portion 40, which serves as the positive electrode lead connection, is present on only a part of the positive electrode current collector 15 in the width direction. Accordingly, an area of the positive electrode mixture slurry to be applied can be larger than that in the case where the exposed portion is formed on the entire region in the width direction, and the capacity can be increased.

According to the present embodiment, the positive electrode current collector 15 relatively moves at a constant speed in the direction of the arrow A with respect to the first and second discharging portions 11 and 12. Accordingly, an elongated electrode sheet material on which the exposed portions 40 are periodically formed in the length direction X can be readily manufactured merely in a manner in which discharge from the discharge nozzle 12a for a first predetermined time and suspension of the discharge for a second predetermined time are alternately repeated. Consequently, the productivity is improved.

The electrode sheet material having periodicity as above is cut along line KK illustrated in FIG. 3 such that the width of the positive electrode current collector 15 is halved after the positive electrode mixture layer is formed. The electrode sheet material is also cut along the central line between two exposed portions 40 adjacent to each other in the length direction.

According to the present embodiment, although the positive electrode current collector 15 relatively moves at a constant speed with respect to the discharge nozzles 11a, 11b, and 12a, the positive electrode current collector may relatively move at a variable speed with respect to the discharge nozzles. In this case, the exposed portions may be formed at regular intervals in a manner in which the control valves are controlled to control the supply of the positive electrode mixture slurry to the discharge nozzles and the suspension of the supply with a predetermined timing based on measurement of movement of the positive electrode current collector with, for example, an encoder.

A local variation in the thickness of the positive electrode mixture layer disposed on the positive electrode current collector prevents a uniform winding structure of the electrode group from being built, and charge and discharge reactions become unstable, which is not preferable. Conventional ones include no overlapping portions denoted by 60a and 60b in FIG. 3. It has been found that, when there are no overlapping portions in the discharge regions, the thickness of the positive electrode mixture layer along the boundary between the adjacent discharge regions is less than the thicknesses of the positive electrode mixture layer in regions other than the boundary.

Table 1 illustrates the result of evaluation of a variation in the thickness of the positive electrode mixture layer of each of positive electrode sheets manufactured in experimental examples in a manner in which the dimensions of the overlapping portions 60a and 60b of the discharge regions in the width direction Y were changed within the range from 0 to 5 mm.

TABLE 1

| | Shape of Front End Portion of Channel of Discharge Nozzle | | Length (mm) of Overlapping Portion in Width Direction | Variation in Thickness of Positive Electrode Mixture Layer |
|---|---|---|---|---|
| | First Discharging Portion | Second Discharging Portion | | |
| Experimental Example 1 | Pattern A | Pattern B | 5 | ±2% |
| Experimental Example 2 | Pattern A | Pattern B | 3 | ±2% |
| Experimental Example 3 | Pattern A | Pattern A | 3 | −5% |
| Experimental Example 4 | Pattern A | Pattern A | 1 | −10% |
| Experimental Example 5 | Pattern A | Pattern A | 0 | −15% |

Experimental Examples 1 and 2

The positive electrode sheets in experimental examples 1 and 2 were manufactured in the following manner. A lithium nickel composite oxide serving as the positive electrode active material, acetylene black (AB) serving as the conductive material, and polyvinylidene fluoride (PVDF) serving as the binder were mixed in a predetermined ratio. The mixture was kneaded in N-methylpyrrolidone (NMP) serving as the dispersion medium to manufacture the positive electrode mixture slurry.

The positive electrode mixture slurry thus manufactured was used to manufacture the positive electrode sheets in the experimental examples 1 and 2 by the method described according to the above embodiment. At this time, the lengths of the overlapping portions 60a and 60b in the width direction Y were 5 mm in the experimental example 1 and 3 mm in the experimental example 2.

In the experimental examples 1 and 2, the length of the front end portion of the channel of each of the discharge nozzles 11a and 11b in the width direction Y increased as the position thereof was nearer to the corresponding discharge port away from the inside, as described with reference to FIG. 5(a). FIG. 7(a) schematically illustrates the shape of the front end portion of the channel that had the increased length in the width direction. The shape is represented as a pattern A in FIG. 7(a) and Table 1. The length of the front end portion of the channel of the discharge nozzle 12a in the width direction Y was constant as described with reference to FIG. 5(b). FIG. 7(b) schematically illustrates the shape of the front end portion of the channel that had the constant length in the width direction Y. The shape is represented as a pattern B in FIG. 7(b) and Table 1. The first discharging portion 11 included the discharge nozzles 11a and 11b. The second discharging portion 12 included the discharge nozzle 12a.

Experimental Example 3 to 5

The positive electrode sheet in an experimental example 3 was manufactured in the same manner as in the experimental example 2 except that the shape of the front end portion of the channel of the discharge nozzle 12a that the second discharging portion 12 included corresponded to the pattern A. The positive electrode sheets in experimental examples 4 and 5 were manufactured in the same manner as in the experimental example 3 except that the lengths of the overlapping portions 60a and 60b in the width direction Y were changed into 1 mm and 0 mm.

The variation in the thickness of the positive electrode mixture layer was evaluated in the following manner. The thickness A of the positive electrode mixture layer at the center of the non-overlapping portion 70 in the width direction Y was measured. Subsequently, the thicknesses B of the positive electrode mixture layer at the center of the overlapping portion 60a and at the center of the overlapping portion 60b in the width direction Y were measured. In the experimental example 5 in which the lengths of the overlapping portions in the width direction Y were 0 mm, the thicknesses of the positive electrode mixture layer at positions corresponding to both ends of the discharge nozzle 12a in the width direction Y were measured as the thicknesses B. The obtained thickness A [μm] and thicknesses B [μm] were used to calculate values by an expression of $(B-A)/A \times 100$ and evaluated the values as the thickness of the positive electrode mixture layer. The smaller the absolute value thereof, the smaller the variation in the thickness of the positive electrode mixture layer.

As illustrated in Table 1, in the experimental example 5 in which the lengths of the overlapping portions 60a and 60b in the width direction Y were 0 mm, the variation in the thickness was −15% the absolute value of which was large. This indicates that when the lengths of the overlapping portions 60a and 60b in the width direction Y were 0 mm, the thicknesses of the positive electrode mixture layer at the positions corresponding to both ends of the discharge nozzle 12a in the width direction Y decreased. In contrast, in the experimental examples 1 to 4 in which the lengths of the overlapping portions 60a and 60b in the width direction Y were 1 to 5 mm, the absolute value of the variation in the thickness decreased, and the thickness of the positive electrode mixture layer was more uniform. In the overlapping portions 60a and 60b, the thickness of the positive electrode mixture layer is expected to be more unstable than in the non-overlapping portions 70, 71, and 72. It was found that there was a tendency that the longer the lengths of the overlapping portions 60a and 60b in the width direction Y, the smaller the variation in the thickness of the positive electrode mixture layer. The lengths of the overlapping portions 60a and 60b in the width direction Y are not particularly limited but are preferably no less than 1 mm and no more than 8 mm, more preferably no less than 3 mm and no more than 5 mm.

International Publication No. 2010/082230 discloses that the width of a front end portion of a channel of a discharge nozzle increases as the position thereof is nearer to a discharge port as in the case of the pattern A, and this prevents an end portion of an applied mixture layer from being raised. However, comparison between the experimental examples 2 and 3 reveals that the intermittent-discharge nozzle of the second discharging portion that has the channel the front end portion of which has a constant length in the width direction Y enables the positive electrode mixture layer to be uniformly formed. According to the present disclosure, the shape of the channel of the discharge nozzle is not particularly limited. However, the shape of the front end portion of the channel of the continuous-discharge nozzle preferably corresponds to the pattern A. The shape of the front end portion of the channel of the intermittent-discharge nozzle preferably corresponds to the pattern B.

The thickness of the positive electrode mixture layer formed on a surface of the positive electrode current collector is not particularly limited but is preferably no less than 40 μm and no more than 200 μm because this enables the overlapping portions to greatly reduce the variation in the thickness of the positive electrode mixture layer.

According to the above embodiment, the length direction X and the width direction Y of the positive electrode current collector are criteria for the description of the positions of the discharge ports of the applicator according to the present disclosure. Accordingly, the positions of the discharge ports of the applicator according to the present disclosure can be specified by using a first direction and a second direction perpendicular to the first direction as follows. That is, the applicator according to the present disclosure includes the discharge ports extending in the first direction, and also includes a region in which each discharge port does not overlap all of the other discharge ports and a region in which each discharge port overlaps a part of another discharge port adjacent to the discharge port when viewed in the second direction.

The present disclosure is not limited to the above embodiment and modifications. Various improvements and modifications can be made within the range of subject matters recited in Claims and equivalent subject matters.

Modifications of the present disclosure regarding a method of arranging the discharge regions will be described. The discharge regions include a first discharge region in which no exposed portion serving as the positive electrode lead connection is formed, and a second discharge region in which an exposed portion serving as the positive electrode lead connection is formed. The first discharge region and the second discharge region can be freely arranged in the width direction such that the exposed portion is formed on the positive electrode current collector at a predetermined position. However, the first discharge region and the second discharge region are preferably arranged alternately in the width direction of the positive electrode current collector. In this case, the first discharge regions are preferably located on both sides of the second discharge region in the width direction. An exposed portion other than the exposed portion serving as the positive electrode lead connection may be formed in the first or second discharge region.

In an example described according to the above embodiment, the three discharge ports 18a, 18b, and 19a are arranged in three rows. However, the number of the discharge ports is determined in accordance with the discharge regions defined on the positive electrode current collector. For example, in the case where the discharge regions are defined so as to be arranged in M rows (M is a natural number of 2 or more) in the length direction of the positive electrode current collector, the discharge ports are also arranged in M rows. Parts of the adjacent discharge regions overlap when viewed in the length direction of the positive electrode current collector, and accordingly, the discharge ports located in the adjacent rows are arranged at a predetermined interval in the length direction of the positive electrode current collector. The discharge ports are preferably disposed in a staggered arrangement in the width direction of the positive electrode current collector. This enables the discharge ports to be compactly arranged.

Figure 8:
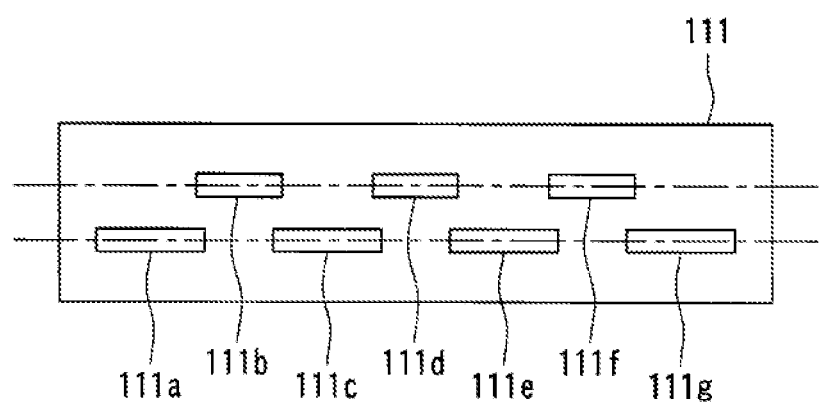
FIG. 8 schematically illustrates a discharging portion according to a modification.

In an example described according to the above embodiment, the discharging portion 11 includes the discharge nozzles 11a and 11b, and the discharging portion 12 includes the discharge nozzle 12a. However, one of the discharging portions can include the discharge nozzles 11a, 11b, and 12a. For example, as illustrated in FIG. 8, a discharging portion 111 having discharge ports 111a to 111g may include the discharge nozzles.

In an example described according to the above embodiment, the control valves of the discharge nozzles 11a, 11b, and 12a are independently controlled. However, some of the discharge nozzles that discharge the positive electrode mixture slurry and suspend the discharge with the same timing can be controlled by a common control valve.

According to the above embodiment, the positive electrode sheet for use in the non-aqueous electrolyte secondary battery is described in detail as an example of the electrode sheet for use in a power storage device. However, examples of the power storage device according to the present disclosure include not only the non-aqueous electrolyte secondary battery but also other batteries such as a nickel-cadmium battery and a nickel-metal hydride battery. The examples of the power storage device also include capacitors other than batteries. For this reason, examples of the electrode sheet for use in the power storage device according to the present disclosure include positive electrode sheets and negative electrode sheets for use in batteries and capacitors. The materials of the current collectors and the mixture slurries are not limited to the materials described according to the embodiment.

According to the above embodiment, the manufacturing method and the applicator according to the present disclosure are used for manufacturing the positive electrode sheet for use in the non-aqueous electrolyte secondary battery. However, the manufacturing method and the applicator according to the present disclosure can be put to other uses such as the case where a material is applied to an object that continuously moves.

REFERENCE SIGNS LIST 11 first discharging portion, 12 second discharging portion, 11a, 11b, 12a, 111a to 111g discharge nozzle, 14 positive electrode mixture layer, 15 positive electrode current collector, 18a, 18b, 19a discharge port, 20, 30 front end portion of a channel, 40 exposed portion, 50 to discharge region, 60a, 60b overlapping portion, 70, 71, non-overlapping portion, 111 discharging portion

The invention claimed is:

1. A method of manufacturing an electrode sheet for use in a power storage device, comprising:
   discharging a mixture slurry into discharge regions of a belt-like current collector that extend in a length direction of the current collector from discharge nozzles corresponding to the respective discharge regions to form a mixture layer on the current collector,
   wherein the discharge regions are arranged such that a part of each discharge region overlaps a part of another discharge region adjacent thereto when viewed in the length direction of the current collector to form an overlapping portion of the discharge regions,
   wherein discharge ports of the discharge nozzles are arranged such that a part of a projection view of each discharge port on the current collector overlaps a part of a projection view of another discharge port adjacent thereto when viewed in the length direction of the current collector to form an overlapping portion of the projection views,
   wherein the mixture slurry is intermittently discharged to form an exposed portion on at least one of the discharge regions, wherein a length of the overlapping portion of the discharge regions is no less than 3 mm and no more than 5 mm in a width direction of the current collector, wherein each of the discharge ports of the discharge nozzles is configured as a slit, wherein the discharge regions include at least one first discharge region and at least one second discharge region that are alternately arranged in the width direction of the current collector, wherein the exposed portion is formed on the at least one second discharge region, wherein a length of a front-end-side channel of at least one of the discharge nozzles corresponding to the at least one first discharge region in the width direction increases as a position thereof is nearer to a discharge port, and a length of a front-end-side channel of at least one of the discharge nozzles corresponding to the at least one second discharge region in the width direction is constant, and wherein the mixture layer has a variation in thickness within a range of +/−2%.

2. The method of manufacturing the electrode sheet for use in the power storage device according to claim 1, wherein a thickness of the mixture layer on the current collector is no less than 40 μm and no more than 200 μm.

3. The method of manufacturing the electrode sheet for use in the power storage device according to claim 1, wherein control valves of the discharge nozzles are independently controlled.

4. The method of manufacturing the electrode sheet for use in the power storage device according to claim 1, wherein the mixture slurry is discharged from the discharge nozzles along a thickness direction of the current collector.

* * * * *